(12) United States Patent
Furumiya

(10) Patent No.: US 6,744,466 B1
(45) Date of Patent: Jun. 1, 2004

(54) METHOD OF DRIVING SOLID-STATE IMAGE SENSOR

(75) Inventor: Masayuki Furumiya, Tokyo (JP)

(73) Assignee: NEC Electronics Corporation, Tokyo (JP)

(*) Notice: Subject to any disclaimer, the term of this patent is extended or adjusted under 35 U.S.C. 154(b) by 0 days.

(21) Appl. No.: 09/266,594

(22) Filed: Mar. 11, 1999

(30) Foreign Application Priority Data

Mar. 12, 1998 (JP) ............................................ 10-061739

(51) Int. Cl.⁷ ................................................. H04N 3/14
(52) U.S. Cl. .................... 348/280; 348/230.1; 348/273; 358/483
(58) Field of Search ............................. 348/230.1, 272, 348/273, 278, 279, 280, 281, 298, 312, 317, 320, 322, 311; 358/482, 483; 250/208.1

(56) References Cited

U.S. PATENT DOCUMENTS

| | | | | |
|---|---|---|---|---|
| 6,275,261 B1 | * | 8/2001 | Yamazaki | .................. 348/273 |
| 6,529,236 B1 | * | 3/2003 | Watanabe | ................. 348/230.1 |
| 2002/0158980 A1 | * | 10/2002 | Iizuka | ......................... 348/280 |
| 2003/0030737 A1 | * | 2/2003 | Yanai | ......................... 348/296 |

FOREIGN PATENT DOCUMENTS

| JP | 50-91417 | 7/1975 |
|---|---|---|
| JP | 61-21689 | 1/1986 |
| JP | 2-196567 | 8/1990 |
| JP | 4-262679 | 9/1992 |
| JP | 5-91417 | 4/1993 |
| JP | 05-91417 | 4/1993 |
| JP | 7-184125 | 7/1995 |
| JP | 08-149374 | 6/1996 |
| JP | 8-149374 | 6/1996 |
| JP | 9-55952 | 2/1997 |

\* cited by examiner

Primary Examiner—Andrew Christensen
Assistant Examiner—Dorothy Wu
(74) Attorney, Agent, or Firm—Sughrue Mion, PLLC

(57) ABSTRACT

There is provided a method of driving a solid-state image sensor, including the steps, in sequence, of (a) converting a light into a plurality of electric charges, (b) selectively reading out the thus converted electric charges in every predetermined number of vertical pixel lines by a first number which is smaller than the predetermined number, into a vertical charge coupled device, (c) repeating the step (b) by the desired number of times, (d) vertically transferring the thus read out electric charges towards a horizontal charge coupled device, (e) adding one of the electric charges read out in the step (b) to associated one of the electric charges read out in the step (c) in the horizontal charge coupled device by vertically transferring electric charges by the predetermined number of vertical pixel lines in the vertical charge coupled device in a horizontal blanking period, and (f) horizontally transferring the thus added electrical charges through the horizontal charge coupled device. The method makes it possible to increase a frame rate, and enhance a signal output, and hence, sensitivity.

26 Claims, 12 Drawing Sheets

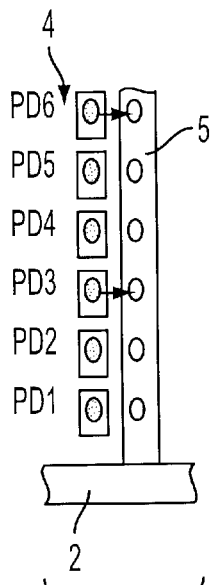
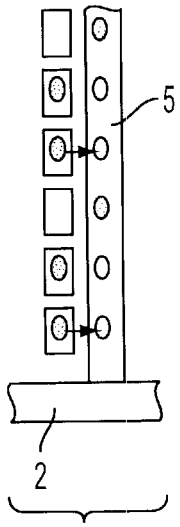
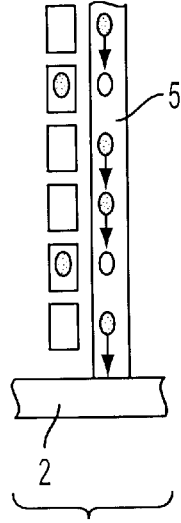
FIG. 7A  FIG. 7B  FIG. 7C
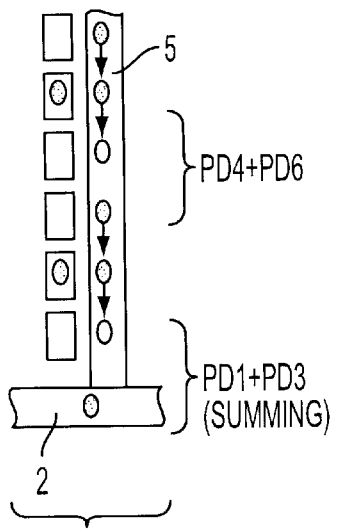
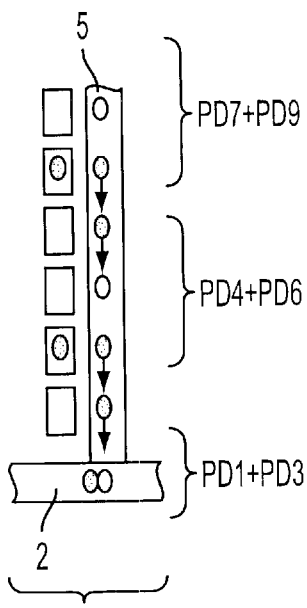
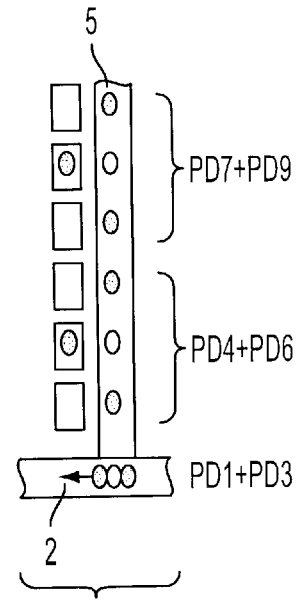
FIG. 7D  FIG. 7E  FIG. 7F

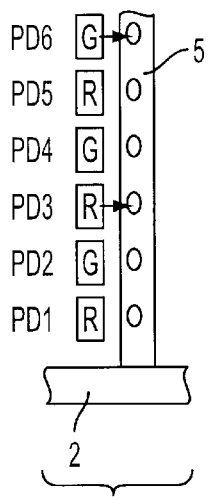 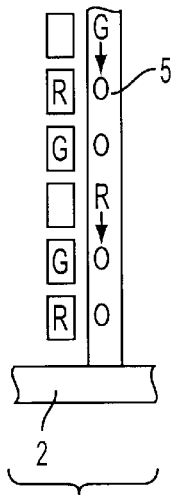 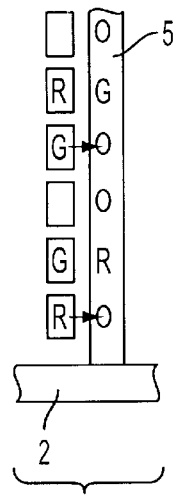 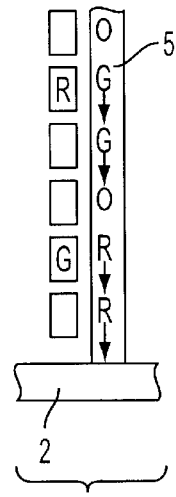
FIG. 12A      FIG. 12B      FIG. 12C      FIG. 12D
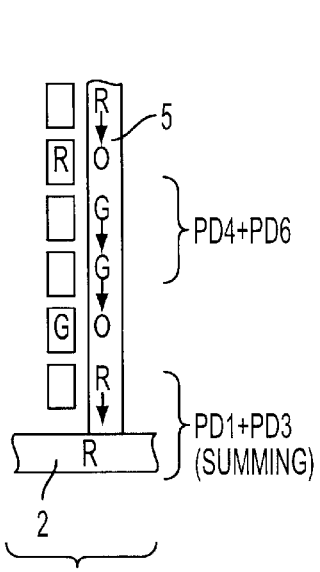 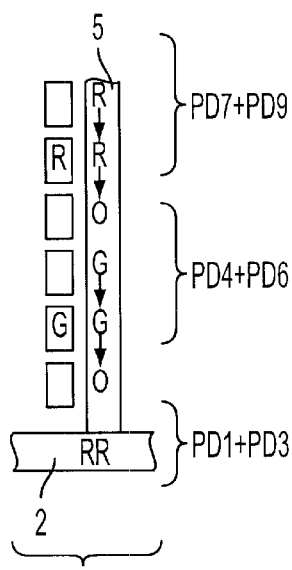 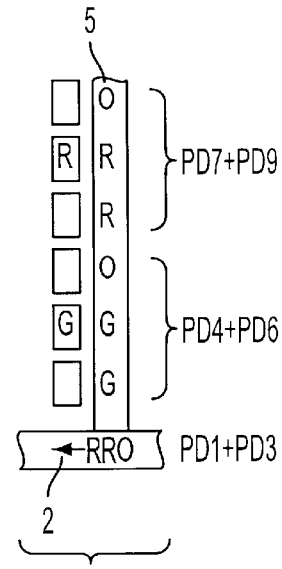
FIG. 12E      FIG. 12F      FIG. 12G

METHOD OF DRIVING SOLID-STATE IMAGE SENSOR

BACKGROUND OF THE INVENTION

1. Field of the Invention

The invention relates to a method of driving a solid-state image sensor, and more particularly to a method of driving a solid-state image sensor which is capable of reading out signal electric charges from photodiodes into a vertical charge coupled device for every predetermined number of vertical pixel lines.

2. Description of the Related Art

These days, there has been developed a camera to be used for a personal computer in order to input images to the computer. An image sensor incorporated in a conventional camera employing a television system such as NTSC and PAL has been conventionally designed to have an interlace system in which a frame is displayed with two fields. For instance, such a image sensor has been suggested in Japanese Unexamined Patent Publications Nos. 61-21689, 2-196567, 4-262679, 7-184125, and 9-55952.

However, an image sensor with an interlace system is accompanied with low resolution of images. Hence, an image sensor incorporated in a camera is recently designed to have a non-interlace system in order to enhance resolution of images. In a non-interlace system, signals running through horizontal scanning lines constituting a frame are output in turn. A non-interlace system has an advantage that images can be displayed with ease on a screen such as a personal computer. Hence, an image sensor associated with a non-interlace system, that is, a progressive scan type image sensor has been in demand, and thus, has been researched.

FIG. 1 is a plan view of an interline type charge coupled device (CCD) image sensor associated with a progressive scan system. The illustrated CCD image sensor is comprised of an image sensing region 1, a horizontal CCD 2, an output section or a charge detector 3, a plurality of photodiodes 4 arranged in the image sensing region 1 in a two-dimensional matrix, and a plurality of vertical CCDs 5 each located adjacent to each row of photodiodes.

Each of the photodiodes 4 transfers a light into a signal electric charge, and accumulates the thus transferred electric charge therein. Each of the vertical CCDs 5 vertically transfers signal electric charges having been transferred from the photodiodes 4. An electric charge reader 6 positioned between each of the photodiodes 4 and each of the vertical CCDs 5 reads a signal electric charge out of each of the photodiodes 4 into each of the vertical CCDs 5. The image sensing region 1 except the photodiodes 4, the vertical CCDs 5, and the electric charge readers 6 defines an insulating region for insulating a device from another device.

In operation, a light is transferred into an electric charge for a certain period of time in each of the photodiodes 4, and the thus generated electric charge is accumulated in each of the photodiodes 4. The electric charges accumulated in the photodiodes 4 are read out into the vertical CCDs 5 through the electric charge readers 6 by applying a certain voltage to the electric charge readers 6. The electric charges having been read out into the vertical CCDs 5 are transferred towards the horizontal CCD 2 by a horizontal line. The electric charges having been transferred to the horizontal CCD 2 are horizontally transferred in the horizontal CCD 2, and then, detected at the output section 3 as an output voltage.

FIG. 2 is a plan view illustrating a positional relation between the photodiodes 4 and vertical transfer electrodes 8 constituting the vertical CCD 5 in a progressive scan type image sensor. The vertical CCD 5 includes four vertical transfer electrodes 8a, 8b, 8c, and 8d for each of the photodiodes 4. At least one of the vertical transfer electrodes 8a, 8b, 8c, and 8d doubles as a read-out electrode for reading out a signal electric charge from the photodiode 4 to the vertical CCD 5. For instance, the vertical transfer electrode 8c doubles as such a read-out electrode.

When each of the vertical CCDs 5 is driven by four-phase pulses $\phi V1$ to $\phi V4$, vertical drive pulses $\phi V1$ to $\phi V4$ are applied to the vertical transfer electrodes 8a to 8d, respectively, in a four-electrode cycle.

FIGS. 3A to 3C illustrate how an electric charge is transferred in progressive scanning operation. For simplification, FIGS. 3A to 3C illustrate only one vertical CCD 5, and a partial horizontal CCD 2 located below the vertical CCD 5. In FIGS. 3A to 3C, a solid circle (●) indicates a packet containing an electric charge therein, and a hollow circle (○) indicates a packet containing no electric charge therein.

With reference to FIG. 3A, the photodiodes PD1 to PD6 are exposed to a light for a certain period of time to thereby transfer a light into signal electric charges, and accumulate the thus generated signal electric charges therein. When a read-out voltage is applied to all the read-out electrodes 6, the signal electric charges accumulated in the photodiodes PD1 to PD6 are read out into the vertical CCD 5.

Then, as illustrated in FIG. 3B, the signal electric charges having been read out into the vertical CCD 5 are transferred towards the horizontal CCD 2 by a horizontal line.

Then, as illustrated in FIG. 3C, the signal electric charge having been transferred in the vertical CCD 5 by a vertical line reaches the horizontal CCD 2, and is transferred through the horizontal CCD 2 by a line. Finally, the signal electric charge is output through the output section 3 (not illustrated in FIGS. 3A to 3C).

FIG. 4 illustrates waveforms of the vertical drive pulses $\phi V1$ to $\phi V4$ and how the electric charges are transferred in progressive scanning operation.

The waveforms of the vertical drive pulses are illustrated over one vertical blanking period and subsequent two horizontal blanking periods. The vertical drive pulses are four-phase pulses. Read-out pulses $\phi TGA$, $\phi TGB$ and $\phi TGC$ read out the signal electric charges from the photodiodes 4 into the vertical CCDs 5. In FIG. 4, the read-out pulses $\phi TGA$, $\phi TGB$, and $\phi TGC$ are shown as independent pulses, however, it should be noted that the read-out pulses $\phi TGA$, $\phi TGB$, and $\phi TGC$ are applied to the vertical transfer electrode 8c doubling as a read-out electrode in the form that the read-out pulses $\phi TGA$, $\phi TGB$, and $\phi TGC$ are overlapped onto the vertical drive pulses $\phi V3A$, $\phi V3B$, and $\phi V3C$, respectively.

In a lower half of FIG. 4, showing how the electric charges are transferred, the photodiodes 4 and the vertical transfer electrodes 8 are illustrated. Lowermost rows indicate horizontal transfer electrodes 9 constituting the horizontal CCD 2. A horizontal drive pulse $\phi H1$ is applied to the horizontal transfer electrodes 9.

In a lower half of FIG. 4, a hollow rectangle indicates a vertical transfer electrode containing no signal electrode charge, and a hatched rectangle indicates a vertical transfer electrode containing a signal electric charge having been read out from the photodiode 4. Transfer of electric charges with the lapse of time can be understood by virtue of the signal waveforms illustrated in an upper half of FIG. 4, and it is also understood that a signal electric charge is located adjacent to which vertical CCD at a certain timing, by virtue of the photodiodes 4 and the vertical transfer electrodes 8 illustrated at the left. Thus, it is understood how electric charges are transferred.

With reference to FIG. 4, when the vertical drive pulses φV1 to φV4 are in a middle level, a channel located below the associated vertical transfer electrode 8 is ready to accumulate electric charges therein. When the vertical drive pulses φV1 to φV4 are in a low level, a channel located below the associated vertical transfer electrode 8 is not ready to accumulate electric charges therein.

When the read-out pulses φTGA, φTGB, and φTGC are in a high level, a signal electric charge is read out from an associated photodiode 4 into the vertical CCD 5. When the read-out pulses φTGA, φTGB, and φTGC are in a low level, a signal electric charge is not read out. At time t1, all the read-out pulses φTGA, φTGB, and φTGC are turned into a high level, signal electric charges accumulated in all the photodiodes 4 are read out into the vertical CCDs 5. The thus read out signal electric charges are accumulated in both a channel located below the vertical transfer electrode 8 associated with the vertical drive pulse φV3 which is in a high level, and a channel located below the vertical transfer electrode 8 associated with the vertical drive pulse φV4 which is in a middle level. Thereafter, the signal electric charges are downwardly, vertically transferred in each of the vertical CCDs 5 by a pixel in a horizontal blanking period.

A solid-state image sensor has been developed not only for a camera for inputting images into a personal computer, but also for an electronic still camera having the same structure as that of a film camera except that an image sensor is substituted for a film used in a film camera. An electronic still camera has a low frame rate in a standard photograph-taking mode. Specifically, the frame rate is about 10 per second.

However, when auto-focus (AF) is to be carried out through the use of sensed images, it would be necessary to prepare a couple of images to tens of images for AF control. If such AF control is to be carried out at the same frame rate (about 10 per second) as the frame rate in the standard photograph-taking mode, it would take a second or longer to adjust a focus, resulting in missing a shutter chance.

Hence, there is a demand in an image sensor which is capable of increasing a frame rate in AF mode, for instance, up to about 30 per second. However, if an image sensor were designed to have a higher drive frequency for increasing a frame rate, power consumption in the image sensor would be disadvantageously increased.

Hence, there has been suggested a method in which the number -of horizontal scanning lines are thinned out in AF mode to thereby enhance a frame rate, based on the fact that slight reduction in resolution would not raise a problem.

However, in accordance with such a method, only signals associated with one line is used among one cycle including three vertical pixel lines, resulting in a problem that a signal electric charge becomes small, and hence, sensitivity is deteriorated.

Hereinbelow is explained this problem with reference to an operation of a progressive scanning type image sensor which is driven with six-phase pulse and to which a read-out voltage is applied in every three vertical pixel lines.

FIGS. 5A to 5E illustrate how electric charges are transferred in a conventional "thinned-out" operation in an image sensor which is capable of reading out electric charges in every three vertical pixel lines. In FIGS. 5A to 5E, a solid circle (●) indicates a packet containing an electric charge therein, a hollow circle (○) indicates a packet containing no electric charge therein. FIGS. 5A to 5E are arranged with the lapse of time.

With reference to FIG. 5A, the photodiodes PD1 to PD6 are exposed to a light for a certain period of time to thereby transfer a light into signal electric charges, and accumulate the thus generated signal electric charges therein. When a read-out voltage is applied to a read-out electrode associated with one line among three vertical pixel lines, the signal electric charges accumulated in the photodiodes PD1 to PD6 are read out into the vertical CCD 5. In this example, as illustrated in FIG. 5A, a read-out voltage is applied to read-out electrodes associated with the photodiodes PD1 and PD4, resulting in that the signal electric charges accumulated in the photodiodes PD1 and PD4 are read out into the vertical CCD 5.

Then, the thus read out electric charges are transferred in the vertical CCD 5 towards the horizontal CCD 2 by three lines in a horizontal blanking period, as illustrated in FIGS. 5B, 5C, and 5D. At the same time, empty packets for two pixels are also transferred together with the electric charges.

Then, as illustrated in FIG. 5E, the signal electric charge having been accumulated in the photodiode PD1 together with the two empty packets are transferred through the horizontal CCD 2 in a horizontal scanning period, and output through the output section 3.

FIG. 6 illustrates waveforms of the vertical drive pulses and how the electric charges are transferred in a conventional "thinned-out" operation in an image sensor which is capable of reading out electric charges in every three vertical pixel lines.

The waveforms of the vertical drive pulses are illustrated over one vertical blanking period and a subsequent horizontal blanking period. The vertical drive pulses are six-phase pulses φV1, φV2, φV3A, φV3B, φV3C, and φV4. Read-out pulses φTGA, φTGB, and φTGC read out the signal electric charges from the photodiodes 4 into the vertical CCDs 5. In FIG. 6, the read-out pulses φTGA, φTGB, and φTGC are shown as independent pulses, however, it should be noted that the read-out pulses φTGA, φTGB, and φTGC are applied to the vertical transfer electrode 8c doubling as a read-out electrode in the form that the read-out pulses φTGA, φTGB, and φTGC are overlapped onto the vertical drive pulses φV3A, φV3B, and φV3C, respectively.

A lower half of FIG. 6, showing how the electric charges are transferred, is almost the same as that of FIG. 4. Lowermost rows indicate horizontal transfer electrodes 9 constituting the horizontal CCD 2. A horizontal drive pulse φH1 is applied to the horizontal transfer electrodes 9.

In a lower half of FIG. 6, a hollow rectangle indicates a vertical transfer electrode containing no signal electrode charge, and a hatched rectangle indicates a vertical transfer electrode containing a signal electric charge having been read out from the photodiode 4.

When the read-out pulse φTGA is turned into a high level at time t2, electric charges contained in the photodiodes PD1 and PD4 associated with the vertical drive pulse φV3A are read out into the vertical CCDs 5. The thus read out signal electric charges are accumulated in both a channel located below the vertical transfer electrode 8 associated with the vertical drive pulse φV3A which is in a high level, and a channel located below the vertical transfer electrode 8 associated with the vertical drive pulse φV4 which is in a middle level. Thereafter, the signal electric charges are downwardly, vertically transferred in each of the vertical CCDs 5 by three pixel lines in a horizontal blanking period.

In FIG. 6, signal electric charges associated with two lines out of three vertical pixel lines are thinned out. That is, a signal electric charge associated with only one vertical pixel line is output to the vertical CCDs 5. As a result, the thinned out operation causes an output signal to have a frame rate three times greater than a frame rate obtained in an ordinary operation in which signal electric charges are not thinned out.

Though axes of abscissa showing the lapse of time are different from each other between FIG. 4 showing the progressive scanning operation and FIG. 6 showing the thinned-out operation, the horizontal blanking period in FIGS. 4 and 6 are identical to each other. That is, the number of lines by which signal electric charges are vertically transferred in a horizontal blanking period is one in the progressive scanning operation illustrated in FIG. 4, whereas three in the thinned-out operation illustrated in FIG. 6. Thus, a frequency at which electric charges are vertically transferred in the thinned-out operation is three times greater than the same in the progressive scanning operation.

As having been explained so far, only a signal electric charge associated with one line out of three lines is used in the thinned-out operation, resulting in that only a small amount of a signal electric signal is transferred, and hence, sensitivity is also deteriorated.

SUMMARY OF THE INVENTION

In view of the above-mentioned problems in conventional methods of driving an image sensor, it is an object of the present invention to provide a method of driving an image sensor which method is capable of avoiding reduction in sensitivity even in a thinned-out operation.

As mentioned earlier, a frequency at which electric charges are vertically transferred in a thinned-out operation is N times greater than the same in a progressive scanning operation (N is a positive integer equal to or greater than 2). As a result, image qualities may be deteriorated due to reduction in an electric charge transfer efficiency which reduction would be caused by the increased frequency. It is also an object of the present invention to provide a method of driving an image sensor which method is capable of avoiding deterioration in image quality.

Another object of the present invention is to provide a method of driving an image sensor which method is applicable to an image sensor including color filters.

There is provided a method of driving a solid-state image sensor, including the steps, in sequence, of (a) converting a light into a plurality of electric charges, (b) selectively reading out the thus converted electric charges in every predetermined number of vertical pixel lines by a first number which is smaller than the predetermined number, into a vertical charge coupled device, (c) repeating the step (b) by the desired number of times, (d) vertically transferring the thus read out electric charges towards a horizontal charge coupled device, (e) adding one of the electric charges read out in the step (b) to associated one of the electric charges read out in the step (c) in the horizontal charge coupled device by vertically transferring electric charges by the predetermined number of vertical pixel lines in the vertical charge coupled device in a horizontal blanking period, and (f) horizontally transferring the thus added electrical charges through the horizontal charge coupled device.

For instance, the predetermined number may be set equal to three, and the first number may be set equal to two. When the predetermined number is set equal to three, it is preferable that electric charges are read out from the first and third vertical pixel lines in the steps (b) and (c).

There is further provided a method of driving a solid-state image sensor, including the steps, in sequence, of (a) converting a light into a plurality of electric charges, (b) selectively reading out the thus converted electric charges from a predetermined number of vertical pixel lines by a first number which is smaller than the predetermined number, into a vertical charge coupled device, (c) vertically transferring the thus read out electric charges towards a horizontal charge coupled device, (d) repeating the steps (b) and (c) by the desired number of times, (e) adding one of the electric charges read out in the step (b) to associated one of the electric charges read out in the step (c) in the horizontal charge coupled device by vertically transferring electric charges by the predetermined number of vertical pixel lines in the vertical charge coupled device in a horizontal blanking period, and (f) horizontally transferring the thus added electrical charges through the horizontal charge coupled device.

It is preferable that a plurality of packets in which electric charges exist are added to each other in the horizontal charge coupled device in a first sectional period in the horizontal blanking period, and one empty packet is transferred into the horizontal charge coupled device in a last sectional period in the horizontal blanking period. For instance, two packets in which electric charges exist may be added to each other in the horizontal charge coupled device in a first sectional period in the horizontal blanking period, and one empty packet may be transferred into the horizontal charge coupled device in a last sectional period in the horizontal blanking period.

There is still further provided a method of driving a solid-state image sensor, including the steps, in sequence, of (a) converting a light into a plurality of electric charges, (b) selectively reading out the thus converted electric charges in every predetermined number of vertical pixel lines by a first number which is smaller than the predetermined number, into a vertical charge coupled device, the vertical pixel lines being covered with color filters, (c) repeating the step (b) by the desired number of times, (d) vertically transferring the thus read out electric charges towards a horizontal charge coupled device, (e) adding one of the electric charges read out in the step (b) to associated one of the electric charges read out in the step (c) in the horizontal charge coupled device by vertically transferring electric charges by the predetermined number of vertical pixel lines in the vertical charge coupled device in a horizontal blanking period, and (f) horizontally transferring the thus added electrical charges through the horizontal charge coupled device.

For instance, the color filters are designed to have red, green, and blue colors, in which case, green and blue may be alternately arranged in n-th horizontal rows, and green and red may be alternately arranged in (n+1)th horizontal rows so that green is sandwiched between blues in upper and lower rows, where n is equal to 1, 3, 5, - - - , (1+2×m) where m is an integer equal to or greater than zero.

It is preferable that the color filters is designed to have a pattern in which the predetermined number of colors are repeated.

There is yet further provided a method of driving a solid-state image sensor, including the steps, in sequence, of (a) converting a light into a plurality of electric charges, (b) selectively reading out the thus converted electric charges from a predetermined number of vertical pixel lines by a first number which is smaller than the predetermined number, into a vertical charge coupled device, the vertical pixel lines being covered with color filters, (c) vertically transferring the thus read out electric charges towards a horizontal charge coupled device, (d) repeating the step (b) and (c) by the desired number of times, (e) adding one of the electric charges read out in the step (b) to associated one of the electric charges read out in the step (d) in the horizontal charge coupled device by vertically transferring electric charges by the predetermined number of vertical pixel lines in the vertical charge coupled device in a horizontal blanking period, and (f) horizontally transferring the thus added electrical charges through the horizontal charge coupled device.

In accordance with the present invention, for instance, signal electric charges associated with two vertical pixel lines out of three vertical pixel lines are read out, and the thus read out signal electric charges associated with the two vertical pixel lines are transferred by three lines in a horizontal blanking period. Thus, the signal electric charges associated with the two vertical pixel lines are added to each other, and the thus added signal electric charges are output. As a result, it is possible to enhance a frame rate, and to obtain a signal output having a magnitude two times greater than a magnitude of a signal output obtained in a conventional operation in which a signal electric charge associated with a line out of three lines is read out, ensuring enhancement in sensitivity.

In accordance with the present invention, when signal electric charges associated with two pixel lines are read out to a vertical CCD, a signal electric charge associated with one of the pixel lines is read out at a different timing from a timing at which a signal electric charge associated with the other is read out. Hence, by successively transferring two packets containing signal electric charges therein, and then, transferring an empty packet containing no signal electric charge, even if a vertical transfer efficiency is decreased, and accordingly a signal electric charge or signal electric charges remain not transferred, when signal electric charges are vertically transferred by three lines in a horizontal blanking period, only the empty packet remains not transferred. This empty packet is added to other packets, when the empty packet is transferred to a horizontal CCD, and hence, it is ensured that deterioration in image quality due to reduction in a vertical transfer efficiency is not caused.

When two pixel lines are to be selected out of three pixel lines, it is preferable that the first and second lines are selected. When the present invention is applied to a color image sensor including a Bayer-arranged color filter, signals of the same color filter are added to the read out signal electric charges, ensuring enhancement in sensitivity in a color image sensor.

The above and other objects and advantageous features of the present invention will be made apparent from the following description made with reference to the accompanying drawings, in which like reference characters designate the same or similar parts throughout the drawings.

BRIEF DESCRIPTION OF THE DRAWINGS

FIGS. 7A to 7F illustrate how electric charges are transferred in a "thinned-out" operation in an image sensor in accordance with the first embodiment of the present invention.

FIGS. 12A to 12G illustrate how electric charges are transferred in a "thinned-out" operation in an image sensor in accordance with the third embodiment of the present invention.

DESCRIPTION OF THE PREFERRED EMBODIMENTS

First Embodiment

Figure 1:
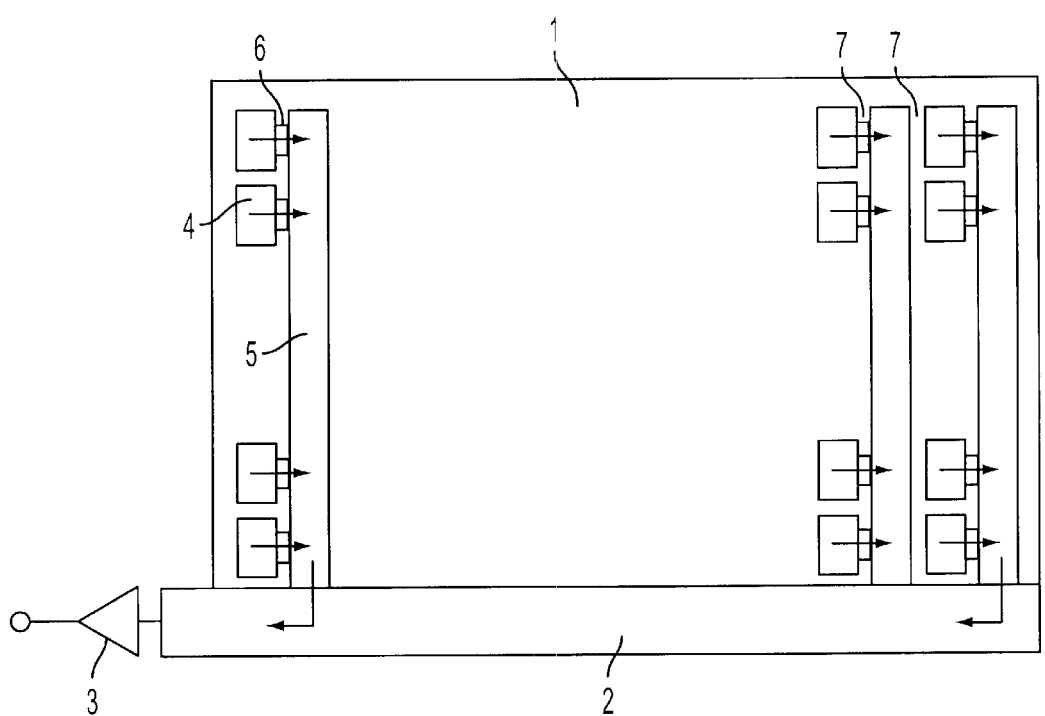
FIG. 1 is a plan view of a progressive scanning type interline CCD image sensor
Figure 2:
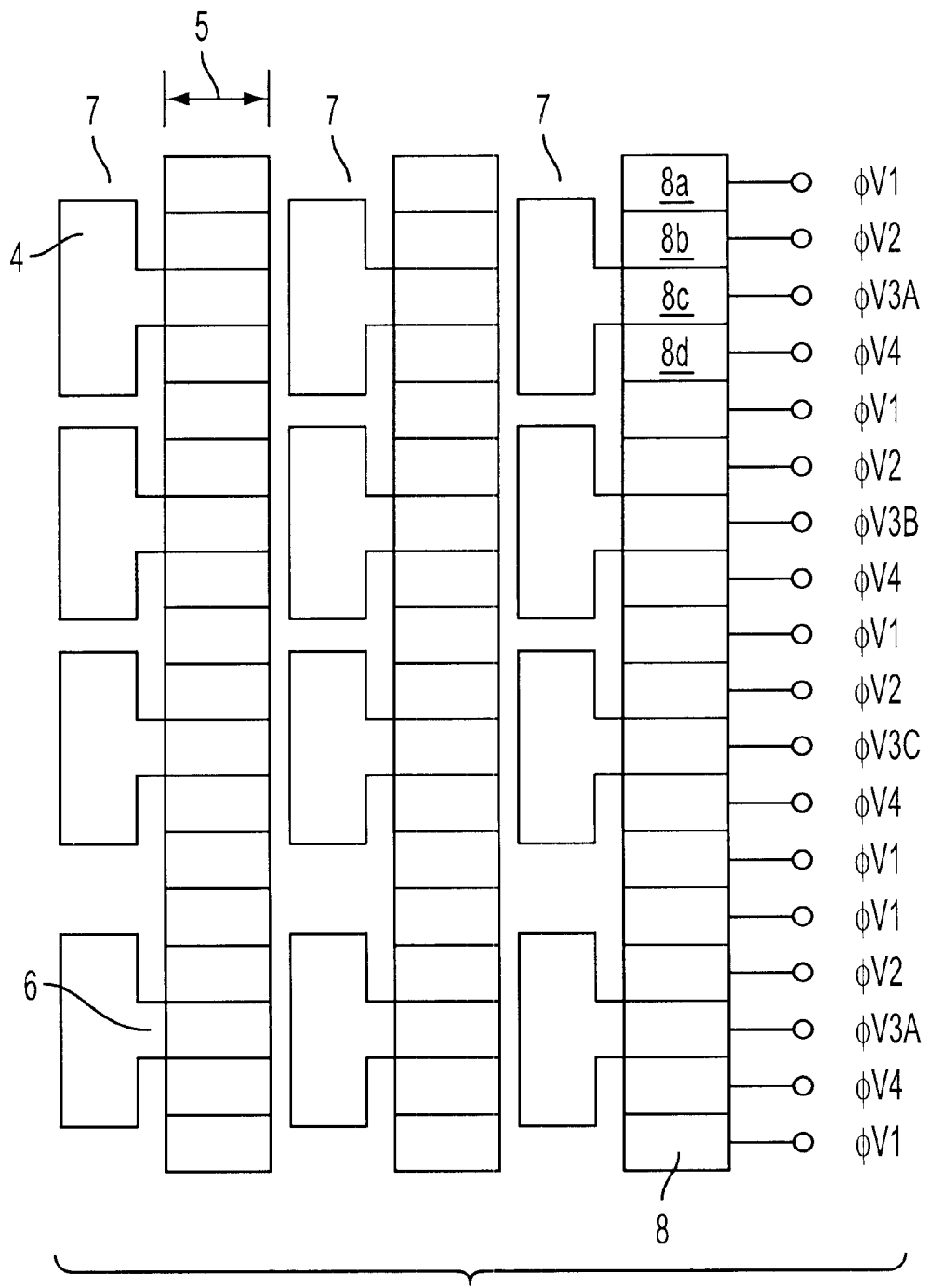
FIG. 2 is a plan view illustrating a positional relation between photodiodes and vertical transfer electrodes in a progressive scanning type image sensor which is capable of reading out signal electric charges in every three pixel lines.
Figure 3A:
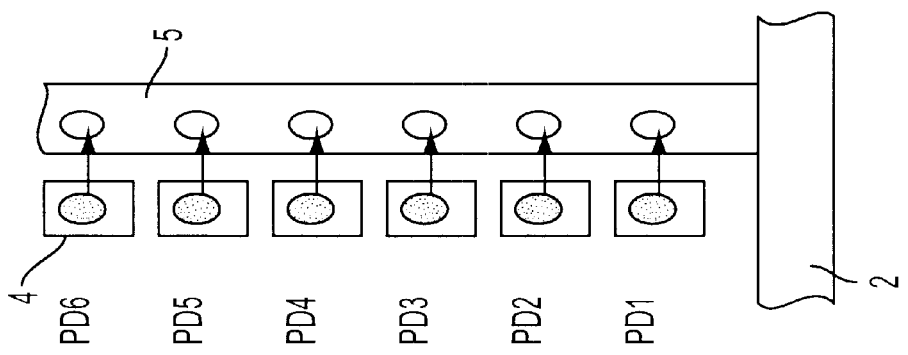
FIGS. 3A, 3B, and 3C illustrate how an electric charge is transferred in progressive scanning operation.
Figure 3B:
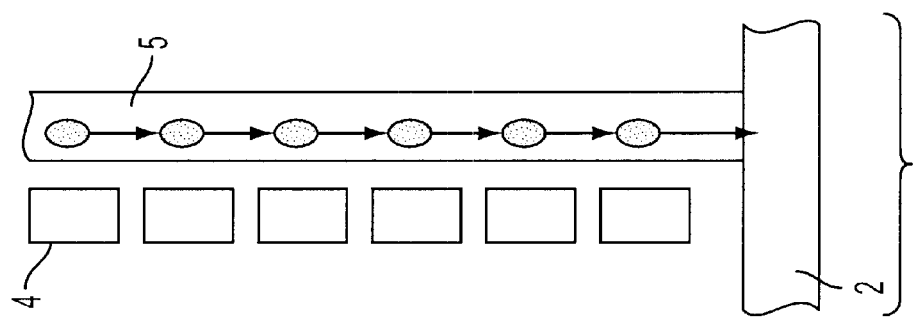
Figure 3C:
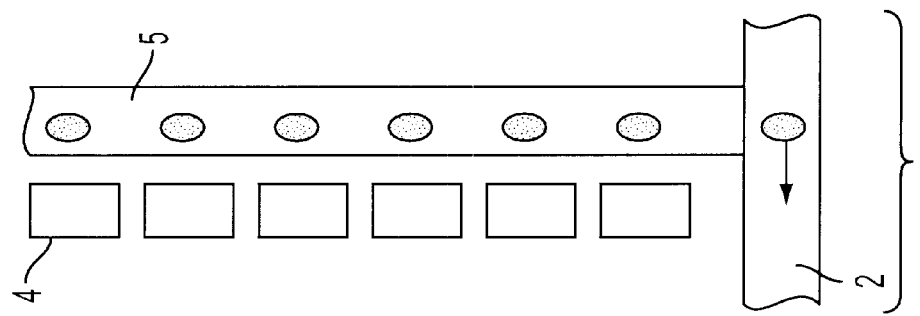

FIGS. 7A to 7F illustrate how electric charges are transferred in a "thinned-out" operation in an image sensor in accordance with the first embodiment. An image sensor in accordance with the first embodiment has the same structure as the structure illustrated in FIGS. 1 and 2.

For simplification, FIGS. 7A to 7F illustrate only one vertical CCD 5, and a partial horizontal CCD 2 located below the vertical CCD 5. In FIGS. 7A to 7F, a solid circle (●) indicates a packet containing an electric charge therein, and a hollow circle (○) indicates a packet containing no electric charge therein. FIGS. 7A to 7F are arranged with the lapse of time.

With reference to FIG. 7A, the photodiodes PD1 to PD6 are exposed to a light for a certain period of time to thereby transfer a light into signal electric charges, and accumulate the thus generated signal electric charges therein. When a read-out voltage is applied to the read-out electrodes 6 associated with two vertical pixel lines having been selected in advance, the signal electric charges accumulated in the associated photodiodes are read out into the vertical CCD 5. In the first embodiment, signal electric charges accumulated in the photodiodes PD3 and PD6 are read out into the vertical CCD 5.

Then, as illustrated in FIG. 7B, signal electric charges accumulated in the photodiodes PD1 and PD4 are read out into the vertical CCD 5.

Though the signal electric charges accumulated in the photodiodes PD3 and PD6 are first read out into the vertical CCD 5 in the first embodiment, the signal electric charges accumulated in the photodiodes PD1 and PD4 may be first read out. As an alternative, the signal electric charges accumulated in the photodiodes PD3 and PD6 and the signal electric charges accumulated in the photodiodes PD1 and PD4 may be concurrently read out.

Then, as illustrated in FIGS. 7C, 7D, and 7E, the thus read out signal electric charges are vertically transferred in the vertical CCD 5 by three pixel lines in a horizontal blanking period. Thus, two packets the containing signal electric charges having been read out from the photodiodes PD1 and PD3, and one empty packet are transferred into the horizontal CCD 2.

The above-mentioned operation having been explained with reference to FIGS. 7A to 7E is carried out in a horizontal blanking period in which electric charge transfer in the horizontal CCD 2 is stopped. Hence, the signal electric charge having been read out from the photodiode PD1 and the signal electric charge having been read out from the photodiode PD3 are added to each other in the horizontal CCD 2. Similarly, the signal electric charge having been read out from the photodiode PD4 and the signal electric charge having been read out from the photodiode PD6 are added to each other in the horizontal CCD 2.

After the signal electric charges have been added to each other in the horizontal CCD 2 as mentioned above, the added signal electric charges are transferred in the horizontal CCD 2 line by line, as illustrated in FIG. 7F.

Figure 4:
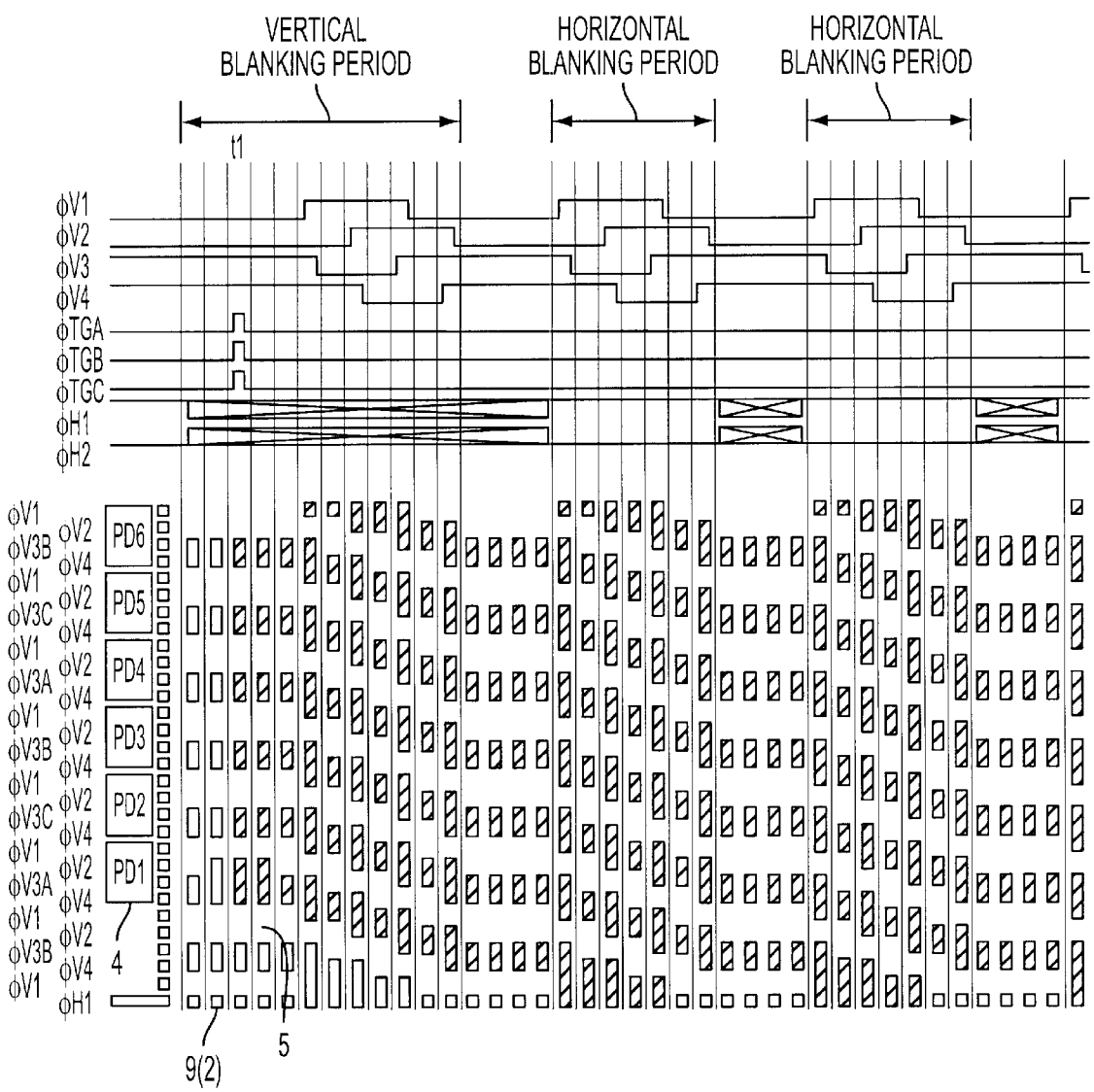
FIG. 4 illustrates waveforms of vertical drive pulses and how signal electric charges are transferred in progressive scanning operation.
Figure 5:
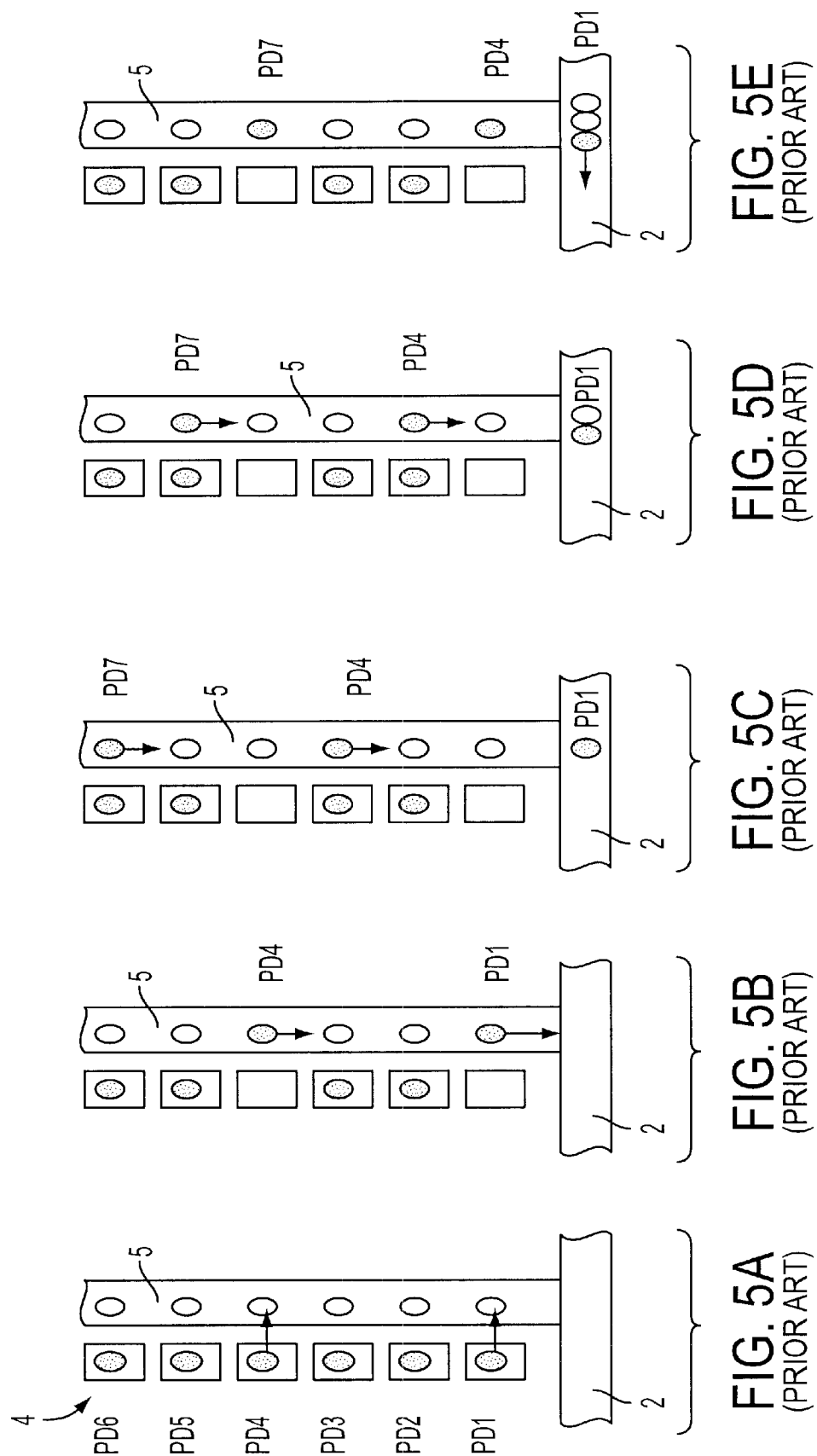
FIGS. 5A to 5E illustrate how electric charges are transferred in a conventional "thinned-out" operation in an image sensor which is capable of reading out electric charges in every three vertical pixel lines.
Figure 6:
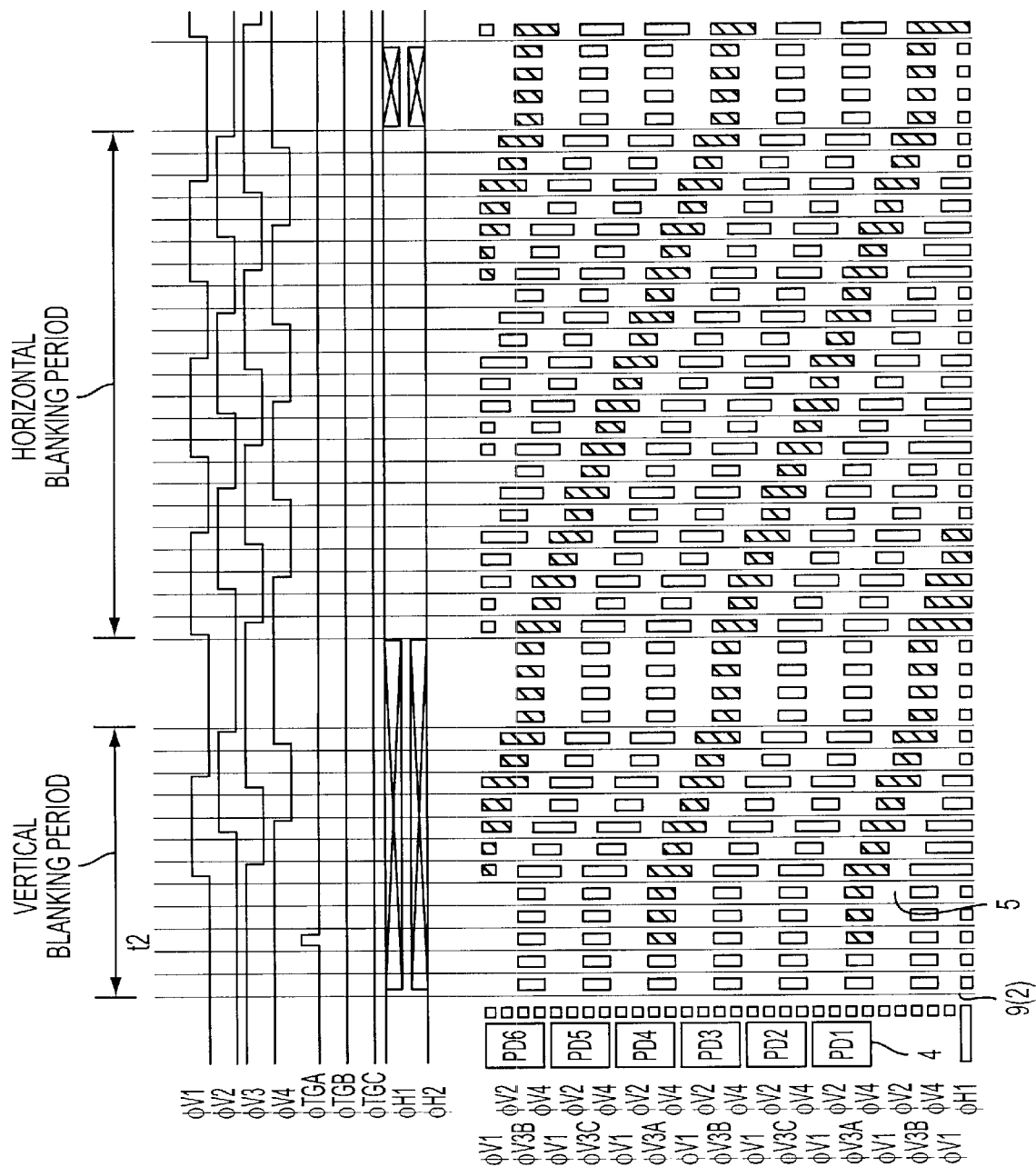
FIG. 6 illustrates waveforms of vertical drive pulses and how signal electric charges are transferred in a conventional "thinned-out" operation in an image sensor which is capable of reading out electric charges in every three vertical pixel lines.
Figure 8:
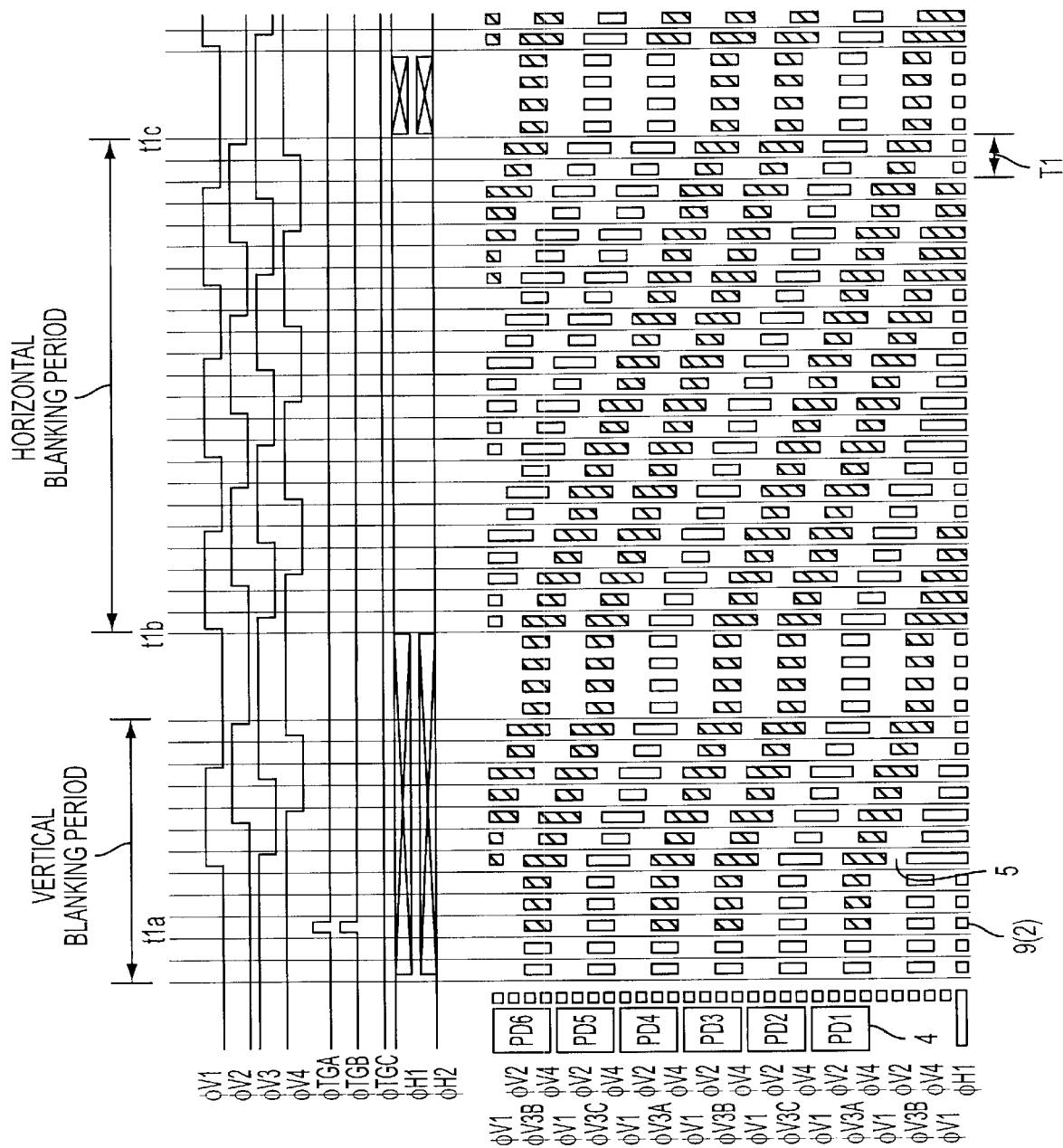
FIG. 8 illustrates waveforms of vertical drive pulses and how signal electric charges are transferred in a "thinned-out" operation in an image sensor in accordance with the first embodiment of the present invention.

FIG. 8 illustrates waveforms of vertical drive pulses and how signal electric charges are transferred in a "thinned-out" operation in the image sensor in accordance with the first embodiment. FIG. 8 is substantially the same as FIG. 4.

The signal electric charges accumulated in the photodiodes PD1 and PD3 are read out into the vertical CCD 5 at time t1a, and then, vertically transferred through the vertical CCD 5. These signal electric charges are added into the horizontal CCD 2 during time t1b to time t1c. Thereafter, these signal electric charges are transferred through the horizontal CCD 2, and output through the output section 3 in a horizontal scanning period.

The above-mentioned operation is carried out in one horizontal blanking period. As a result, a "thinned-out" operation can be carried out in an image sensor which is capable of reading out signal electric charges in every three pixel lines, ensuring a frame time three times greater than a frame time obtained in a conventional "thinned-out" operation.

In accordance with the first embodiment, it is possible to output a signal indicative of two electric charges added to each other among electric charges associated with three pixel lines, in spite of enhancement in a frame rate. Accordingly, the first embodiment provides electric charges twice greater in amount than electric charges obtained in a conventional method in which a signal electric charge associated with a pixel line is thinned out from signal electric charges associated with three pixel lines, and hence, provides sensitivity twice greater than conventional one.

Second Embodiment

FIGS. 9A to 9G illustrate how electric charges are transferred in a "thinned-out" operation in an image sensor in accordance with the second embodiment. An image sensor in accordance with the second embodiment has the same structure as the structure illustrated in FIGS. 1 and 2.

For simplification, FIGS. 9A to 9G illustrate only one vertical CCD 5, and a partial horizontal CCD 2 located below the vertical CCD 5. In FIGS. 9A to 9G, a solid circle (●) indicates a packet containing an electric charge therein, and a hollow circle (○) indicates a packet containing no electric charge therein. FIGS. 9A to 9G are arranged with the lapse of time.

Figure 9A:
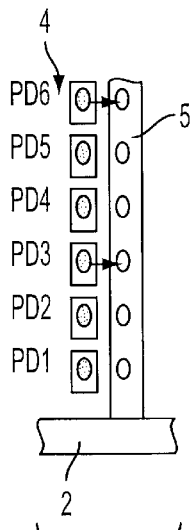
FIGS. 9A to 9G illustrate how electric charges are transferred in a "thinned-out" operation in an image sensor in accordance with the second embodiment of the present invention.

With reference to FIG. 9A, the photodiodes PD1 to PD6 are exposed to a light for a certain period of time to thereby transfer a light into signal electric charges, and accumulate the thus generated signal electric charges therein. When a read-out voltage is applied to the read-out electrodes 6 associated with two vertical pixel lines having been selected in advance, the signal electric charges accumulated in the associated photodiodes are read out into the vertical CCD 5. In the second embodiment, signal electric charges accumulated in the photodiodes PD3 and PD6 are read out into the vertical CCD 5.

Figure 9B:
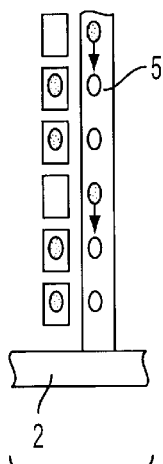

Then, as illustrated in FIG. 9B, the signal electric charges having been read out into the vertical CCD 5 are transferred through the vertical CCD 5 by one pixel line.

Figure 9C:
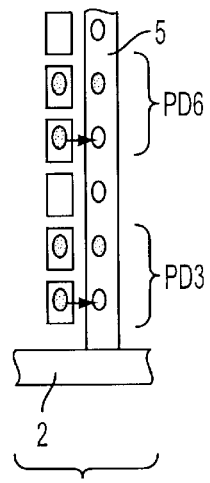

Then, as illustrated in FIG. 9C, signal electric charges accumulated in the photodiodes PD1 and PD4 are read out into the vertical CCD 5.

Though the signal electric charges accumulated in the photodiodes PD3 and PD6 are first read out into the vertical CCD 5 in the second embodiment, the signal electric charges accumulated in the photodiodes PD1 and PD4 may be first read out.

Figure 9D:
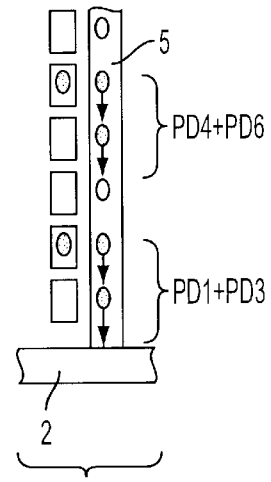
Figure 9E:
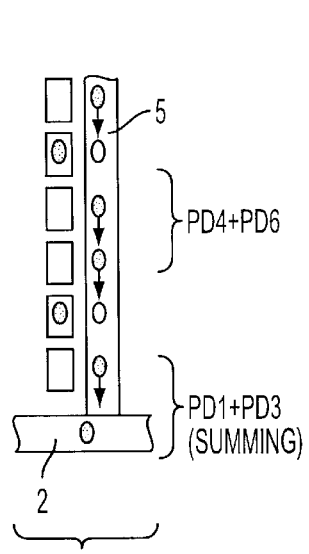
Figure 9F:
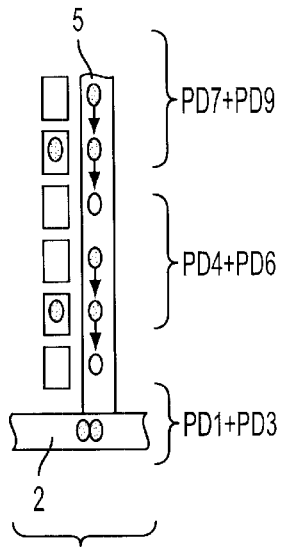

Then, as illustrated in FIGS. 9D, 9E, and 9F, the signal electric charges having been read out from the photodiodes PD1 and PD3 are transferred in adjacent packets through the vertical CCD 5 towards the horizontal CCD 2.

The above-mentioned operation having been explained with reference to FIGS. 9A to 9F is carried out in a horizontal blanking period in which electric charge transfer in the horizontal CCD 2 is stopped. Hence, the signal electric charge having been read out from the photodiode PD1 and the signal electric charge having been read out from the photodiode PD3 are added to each other in the horizontal CCD 2. Similarly, the signal electric charge having been read out from the photodiode PD4 and the signal electric charge having been read out from the photodiode PD6 are added to each other in the horizontal CCD 2.

Figure 9G:
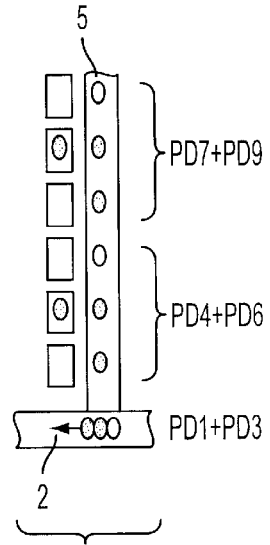

After the signal electric charges have been added to each other in the horizontal CCD 2 as mentioned above, the added signal electric charges are transferred in the horizontal CCD 2 line by line, as illustrated in FIG. 9G.

Figure 10:
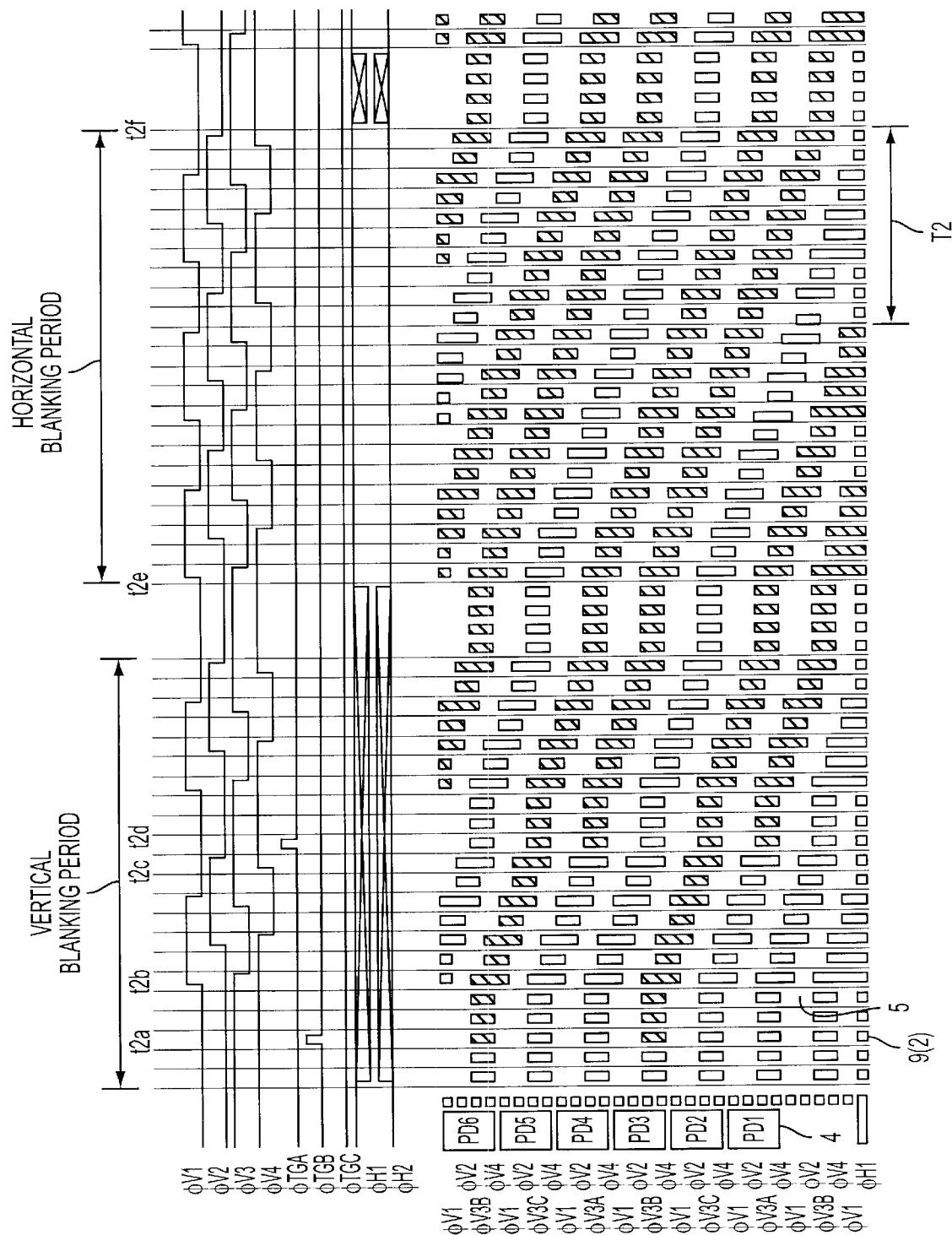
FIG. 10 illustrates waveforms of vertical drive pulses and how signal electric charges are transferred in a "thinned-out" operation in an image sensor in accordance with the second embodiment of the present invention.

FIG. 10 illustrates waveforms of vertical drive pulses and how signal electric charges are transferred in a "thinned-out" operation in the image sensor in accordance with the first embodiment. FIG. 10 is substantially the same as FIG. 8.

The signal electric charges accumulated in the photodiodes PD3 and PD6 are read out into the vertical CCD 5 at time t2a, and then, vertically transferred through the vertical CCD 5. Then, these signal electric charges are transferred through the vertical CCD 5 by one line during time t2b to time t2c.

The signal electric charges accumulated in the photodiodes PD1 and PD4 are read out into the vertical CCD 5 at time t2d. Then, these signal electric charges are transferred through the vertical CCD 5 by one line.

The signal electric charge having been read out from the photodiode PD1 and the signal electric charge having been read out from the photodiode PD3 are added to each other in the horizontal CCD 2 during time t2e to time t2f. Similarly, the signal electric charge having been read out from the photodiode PD4 and the signal electric charge having been read out from the photodiode PD6 are added to each other in the horizontal CCD 2 during time t2e to time t2f.

Thereafter, these signal electric charges are transferred through the horizontal CCD 2, and output through the output section 3 in a horizontal scanning period.

The above-mentioned operation is carried out in one horizontal blanking period. As a result, the "thinned-out" operation can be carried out in an image sensor which is capable of reading out signal electric charges in every three pixel lines, ensuring a frame time three times greater than a frame time obtained in a conventional "thinned-out" operation.

In addition, the second embodiment provides electric charges twice greater in amount than electric charges obtained in a conventional "thinned-out" operation, and hence, provides sensitivity twice greater than conventional one.

Furthermore, the second embodiment provides an additional advantage. In the first embodiment, a period from termination of the vertical transfer of signal electric charges to commencement of a horizontal blanking period, in which the signal electric charges have been completely transferred into the horizontal CCD 2 from the vertical CCD 5, is indicated as a period T1 in FIG. 8. In the thinned-out operation in the first embodiment, a frequency at which signal electric charges are vertically transferred is three times greater than such a frequency in a progressive scanning operation. Hence, if there occurs a defectiveness in the vertical transfer, there would be produced after images, which would deteriorate image quality.

In the second embodiment, a period from termination of the vertical transfer of signal electric charges to commencement of a horizontal blanking period, in which the signal electric charges have been completely transferred into the horizontal CCD 2 from the vertical CCD 5, is indicated as a period T2 in FIG. 10. The last packet is empty in the vertically transferred packets in the second embodiment. Thus, even if a defectiveness occurs while electric charges associated with the photodiodes PD3 and PD6 are being transferred into the vertical CCD 5, it just happens that a signal is introduced into the empty packet. There is sufficient time for the signal having been introduced into the empty packet to be transferred into the horizontal CCD 2. Hence, after images are less likely to be produced in the second embodiment than in the first embodiment.

Third Embodiment

In the third embodiment, the present invention is applied to a color image sensor including color filters.

Figure 11:
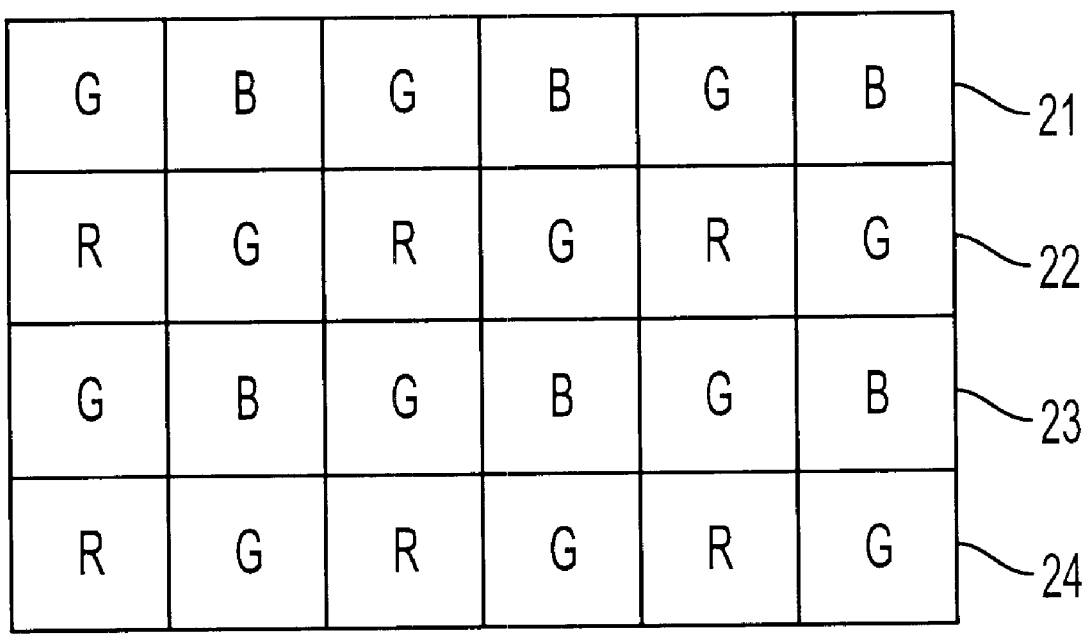
FIG. 11 illustrates arrangement of colors in a color filter.

FIG. 11 illustrates an example of a color filter arranged in alignment with photodiodes in an image sensor. The illustrated color filter includes red (R), green (G), and blue (B) filters. The arrangement illustrated in FIG. 11 is so-called a Bayer arrangement. That is, green and blue are alternately arranged in the first and third horizontal rows 21 and 23, and green and red are alternately arranged in the second and fourth horizontal rows 22 and 24 so that green is sandwiched between blues in the upper and lower rows (for instance, green in the second horizontal row 22 is sandwiched between blues in the first and third horizontal rows 21 and 23.

Hereinbelow is explained a thinned-out operation in an image sensor which is capable of reading out signal electric charges in every two pixel lines and which has a color filter.

FIGS. 12A to 12G illustrate how electric charges are transferred in a "thinned-out" operation in the color image sensor. The color image sensor in the third embodiment has the same structure as the structure illustrated in FIGS. 1 and 2, and additionally has the color filter as illustrated in FIG. 11. As mentioned earlier, the color filter is arranged in alignment with the photodiodes 4.

In FIGS. 12A to 12G, a solid circle (●) indicates a packet containing an electric charge therein, and a hollow circle (○) indicates a packet containing no electric charge therein. FIGS. 12A to 12G are arranged with the lapse of time.

With reference to FIG. 12A, the photodiodes PD1 to PD6 are exposed to a light for a certain period of time to thereby transfer a light into signal electric charges, and accumulate the thus generated signal electric charges therein. When a read-out voltage is applied to the read-out electrodes 6 associated with two vertical pixel lines having been selected in advance, the signal electric charges accumulated in the associated photodiodes are read out into the vertical CCD 5. In the third embodiment, signal electric charges accumulated in the photodiodes PD3 and PD6 are read out into the vertical CCD 5. The photodiode PD3 is covered with a red color filter, and the photodiode PD6 is covered with a green color filter.

Then, as illustrated in FIG. 12B, the signal electric charges having been read out into the vertical CCD 5 are transferred through the vertical CCD 5 by one pixel line.

Then, as illustrated in FIG. 12C, signal electric charges accumulated in the photodiodes PD1 and PD4 are read out into the vertical CCD 5. The photodiode PD1 is covered with a red color filter, and the photodiode PD4 is covered with a green color filter.

Though the signal electric charges accumulated in the photodiodes PD3 and PD6 are first read out into the vertical CCD 5 in the second embodiment, the signal electric charges accumulated in the photodiodes PD1 and PD4 may be first read out.

Then, as illustrated in FIGS. 12C to 12F, the signal electric charges having been read out from the photodiodes PD1 and PD3 both covered with a red color filter are transferred in adjacent packets through the vertical CCD 5 towards the horizontal CCD 2. Similarly, the signal electric charges having been read out from the photodiodes PD4 and PD6 both covered with a green color filter are transferred in adjacent packets through the vertical CCD 5 towards the horizontal CCD 2

The above-mentioned operation having been explained with reference to FIGS. 12A to 12F is carried out in a horizontal blanking period in which electric charge transfer in the horizontal CCD 2 is stopped. Hence, the signal electric charge having been read out from the photodiode PD1 and the signal electric charge having been read out from the photodiode PD3 are added to each other in the horizontal CCD 2. Similarly, the signal electric charge having been read out from the photodiode PD4 and the signal electric charge having been read out from the photodiode PD6 are added to each other in the horizontal CCD 2.

After the signal electric charges have been added to each other in the horizontal CCD 2 as mentioned above, the added signal electric charges are transferred in the horizontal CCD 2 line by line, as illustrated in FIG. 12G.

In accordance with the third embodiment, the signal electric charges read out from the photodiodes covered with the same color filters, resulting in that electric charges are doubled in an amount relative to a conventional color image sensor, and accordingly, sensitivity is enhanced.

While the present invention has been described in connection with certain preferred embodiments, it is to be understood that the subject matter encompassed by way of the present invention is not to be limited to those specific embodiments. On the contrary, it is intended for the subject matter of the invention to include all alternatives, modifications and equivalents as can be included within the spirit and scope of the following claims.

The entire disclosure of Japanese Patent Application No. 10-61739 filed on Mar. 12, 1998 including specification, claims, drawings and summary is incorporated herein by reference in its entirety.

What is claimed is:

1. A method of driving a solid-state image sensor, comprising the steps, in sequence, of
   (a) converting a light into a plurality of electric charges;
   (b) selectively reading out the thus converted electric charges in every predetermined number of vertical pixel lines by a first number which is smaller than said predetermined number, into a vertical charge coupled device;
   (c) repeating said step (b) by the desired number of times;
   (d) vertically transferring the thus read out electric charges towards a horizontal charge coupled device;
   (e) adding one of said electric charges read out in said step (b) to associated one of said electric charges read out in said step (c) in said horizontal charge coupled device by vertically transferring electric charges by said predetermined number of vertical pixel lines in said vertical charge coupled device in a horizontal blanking period; and
   (f) horizontally transferring the thus added electrical charges through said horizontal charge coupled device,
   wherein said predetermined number is three, and said first number is two.

2. A method of driving a solid-state image sensor, comprising the steps, in sequence, of
   (a) converting a light into a plurality of electric charges;
   (b) selectively reading out the thus converted electric charges in every predetermined number of vertical pixel lines by a first number which is smaller than said predetermined number, into a vertical charge coupled device;
   (c) repeating said step (b) by the desired number of times;
   (d) vertically transferring the thus read out electric charges towards a horizontal charge coupled device;
   (e) adding one of said electric charges read out in said step (b) to associated one of said electric charges read out in said step (c) in said horizontal charge coupled device by vertically transferring electric charges by said predetermined number of vertical pixel lines in said vertical charge coupled device in a horizontal blanking period; and
   (f) horizontally transferring the thus added electrical charges through said horizontal charge coupled device,
   wherein said predetermined number is three, and wherein electric charges are read out from the first and third vertical pixel lines in said steps (b) and (c).

3. A method of driving a solid-state image sensor, comprising the steps, in sequence, of:
   (a) converting a light into a plurality of electric charges;
   (b) selectively reading out the thus converted electric charges from a predetermined number of vertical pixel lines by a first number which is smaller than said predetermined number, into a vertical charge coupled device;
   (c) vertically transferring the thus read out electric charges towards a horizontal charge coupled device;
   (d) repeating said steps (b) and (c) by the desired number of times;
   (e) adding one of said electric charges read out in said step (b) to associated one of said electric charges read out in said step (c) in said horizontal charge coupled device by vertically transferring electric charges by said predetermined number of vertical pixel lines in said vertical charge coupled device in a horizontal blanking period; and
   (f) horizontally transferring the thus added electrical charges through said horizontal charge coupled device,
   wherein said predetermined number is three, and said first number is two.

4. The method as set forth in claim 3, wherein a plurality of packets in which electric charges exist are added to each other in said horizontal charge coupled device in a first sectional period in said horizontal blanking period, and one empty packet is transferred into said horizontal charge coupled device in a last sectional period in said horizontal blanking period.

5. The method as set forth in claim 3, wherein two packets in which electric charges exist are added to each other in said horizontal charge coupled device in a first sectional period in said horizontal blanking period, and one empty packet is transferred into said horizontal charge coupled device in a last sectional period in said horizontal blanking period.

6. A method of driving a solid-state image sensor, comprising the steps, in sequence, of:
   (a) converting a light into a plurality of electric charges;
   (b) selectively reading out the thus converted electric charges from a predetermined number of vertical pixel lines by a first number which is smaller than said predetermined number, into a vertical charge coupled device;
   (c) vertically transferring the thus read out electric charges towards a horizontal charge coupled device;
   (d) repeating said steps (b) and (c) by the desired number of times;
   (e) adding one of said electric charges read out in said step (b) to associated one of said electric charges read out in said step (c) in said horizontal charge coupled device by vertically transferring electric charges by said predetermined number of vertical pixel lines in said vertical charge coupled device in a horizontal blanking period; and
   (f) horizontally transferring the thus added electrical charges through said horizontal charge coupled device,
   wherein said predetermined number is three, and wherein electric charges are read out from the first and third vertical pixel lines in said steps (b) and (d).

7. The method as set forth in claim 6, wherein a plurality of packets in which electric charges exist are added to each other in said horizontal charge coupled device in a first sectional period in said horizontal blanking period, and one empty packet is transferred into said horizontal charge coupled device in a last sectional period in said horizontal blanking period.

8. A method of driving a solid-state image sensor, comprising the steps, in sequence, of:
   (a) converting a light into a plurality of electric charges;
   (b) selectively reading out the thus converted electric charges in every predetermined number of vertical pixel lines by a first number which is smaller than said predetermined number, into a vertical charge coupled device, said vertical pixel lines being covered with color filters;

(c) repeating said step (b) by the desired number of times;

(d) vertically transferring the thus read out electric charges towards a horizontal charge coupled device;

(e) adding one of said electric charges read out in said step (b) to associated one of said electric charges read out in said step (c) in said horizontal charge coupled device by vertically transferring electric charges by said predetermined number of vertical pixel lines in said vertical charge coupled device in a horizontal blanking period; and (f) horizontally transferring the thus added electrical charges through said horizontal charge coupled device, wherein said predetermined number is three, and said first number is two.

9. The method as set forth in claim 8, wherein said color filters are designed to have red, green, and blue colors.

10. The method as set forth in claim 9, wherein green and blue are alternately arranged in n-th horizontal rows, and green and red are alternately arranged in (n+1)th horizontal rows so that green is sandwiched between blues in upper and lower rows, where n is equal to $1, 3, 5, ---, (1+2\times m)$ where m is an integer equal to or greater than zero.

11. The method as set forth in claim 8, wherein said color filters has a pattern in which said predetermined number of colors are repeated.

12. A method of driving a solid-state image sensor, comprising the steps, in sequence, of:

(a) converting a light into a plurality of electric charges;

(b) selectively reading out the thus converted electric charges in every predetermined number of vertical pixel lines by a first number which is smaller than said predetermined number, into a vertical charge coupled device, said vertical pixel lines being covered with color filters;

(c) repeating said step (b) by the desired number of times;

(d) vertically transferring the thus read out electric charges towards a horizontal charge coupled device;

(e) adding one of said electric charges read out in said step (b) to associated one of said electric charges read out in said step (c) in said horizontal charge coupled device by vertically transferring electric charges by said predetermined number of vertical pixel lines in said vertical charge coupled device in a horizontal blanking period: and (f) horizontally transferring the thus added electrical charges through said horizontal charge coupled device, wherein said predetermined number is three, and wherein electric charges are read out from the first and third vertical pixel lines in said steps (b) and (c).

13. The method as set forth in claim 12, wherein said color filters are designed to have red, green, and blue colors.

14. The method as set forth in claim 13, wherein green and blue are alternately arranged in n-th horizontal rows, and green and red are alternately arranged in (n+1)th horizontal rows so that green is sandwiched between blues in upper and lower rows, where n is equal to $1, 3, 5, ---, (1+2\times m)$ where m is an integer equal to or greater than zero.

15. The method as set forth in claim 12, wherein said color filters has a pattern in which said predetermined number of colors are repeated.

16. A method of driving a solid-state image sensor, comprising the steps, in sequence, of:

(a) converting a light into a plurality of electric charges;

(b) selectively reading out the thus converted electric charges from a predetermined number of vertical pixel lines by a first number which is smaller than said predetermined number, into a vertical charge coupled device, said vertical pixel lines being covered with color filters;

(c) vertically transferring the thus read out electric charges towards a horizontal charge coupled device;

(d) repeating said steps (b) and (c) by the desired number of times;

(e) adding one of said electric charges read out in said step (b) to associated one of said electric charges read out in said step (d) in said horizontal charge coupled device by vertically transferring electric charges by said predetermined number of vertical pixel lines in said vertical charge coupled device in a horizontal blanking period; and (f) horizontally transferring the thus added electrical charges through said horizontal charge coupled device, wherein said predetermined number is three, and said first number is two.

17. The method as set forth in claim 16, wherein said color filters are designed to have red, green, and blue colors.

18. The method as set forth in claim 17, wherein green and blue are alternately arranged in n-th horizontal rows, and green and red are alternately arranged in (n+1)th horizontal rows so that green is sandwiched between blues in upper and lower rows, where n is equal to $1, 3, 5, ---, (1+2\times m)$ where m is an integer equal to or greater than zero.

19. The method as set forth in claim 16, wherein a plurality of packets in which electric charges exist are added to each other in said horizontal charge coupled device in a first sectional period in said horizontal blanking period, and one empty packet is transferred into said horizontal charge coupled device in a last sectional period in said horizontal blanking period.

20. The method as set forth in claim 16, wherein two packets in which electric charges exist are added to each other in said horizontal charge coupled device in a first sectional period in said horizontal blanking period, and one empty packet is transferred into said horizontal charge coupled device in a last sectional period in said horizontal blanking period.

21. The method as set forth in claim 16, wherein said color filters has a pattern in which said predetermined number of colors are repeated.

22. A method of driving a solid-state image sensor, comprising the steps, in sequence, of:

(a) converting a light into a plurality of electric charges;

(b) selectively reading out the thus converted electric charges from a predetermined number of vertical pixel lines by a first number which is smaller than said predetermined number, into a vertical charge coupled device, said vertical pixel lines being covered with color filters;

(c) vertically transferring the thus read out electric charges towards a horizontal charge coupled device;

(d) repeating said steps (b) and (c) by the desired number of times;

(e) adding one of said electric charges read out in said step (b) to associated one of said electric charges read out in said step (d) in said horizontal charge coupled device by vertically transferring electric charges by said predetermined number of vertical pixel lines in said vertical charge coupled device in a horizontal blanking period; and (f) horizontally transferring the thus added electrical charges through said horizontal charge coupled device, wherein said predetermined number is three, and wherein electric charges are read out from the first and third vertical pixel lines in said steps (b) and (d).

23. The method as set forth in claim 22, wherein said color filters are designed to have red, green, and blue colors.

24. The method as set forth in claim 23, wherein green and blue are alternately arranged in n-th horizontal rows, and green and red are alternately arranged in (n+1)th horizontal rows so that green is sandwiched between blues in upper and lower rows, where n is equal to 1, 3, 5, - - - , (1+2×m) where m is an integer equal to or greater than zero.

25. The method as set forth in claim 22, wherein a plurality of packets in which electric charges exist are added to each other in said horizontal charge coupled device in a first sectional period in said horizontal blanking period, and one empty packet is transferred into said horizontal charge coupled device in a last sectional period in said horizontal blanking period.

26. The method as set forth in claim 22, wherein said color filters has a pattern in which said predetermined number of colors are repeated.

* * * * *